Dec. 4, 1945.  H. W. WILKINS  2,390,283
SPRING FORMING MACHINE
Filed Sept. 9, 1942  13 Sheets-Sheet 1

INVENTOR
Howard W. Wilkins.
BY
Harness, Dickey & Pierce.
ATTORNEYS.

Dec. 4, 1945.  H. W. WILKINS  2,390,283
SPRING FORMING MACHINE
Filed Sept. 9, 1942   13 Sheets-Sheet 2

INVENTOR
Howard W. Wilkins.
BY
Harness, Dickey & Pierce
ATTORNEYS.

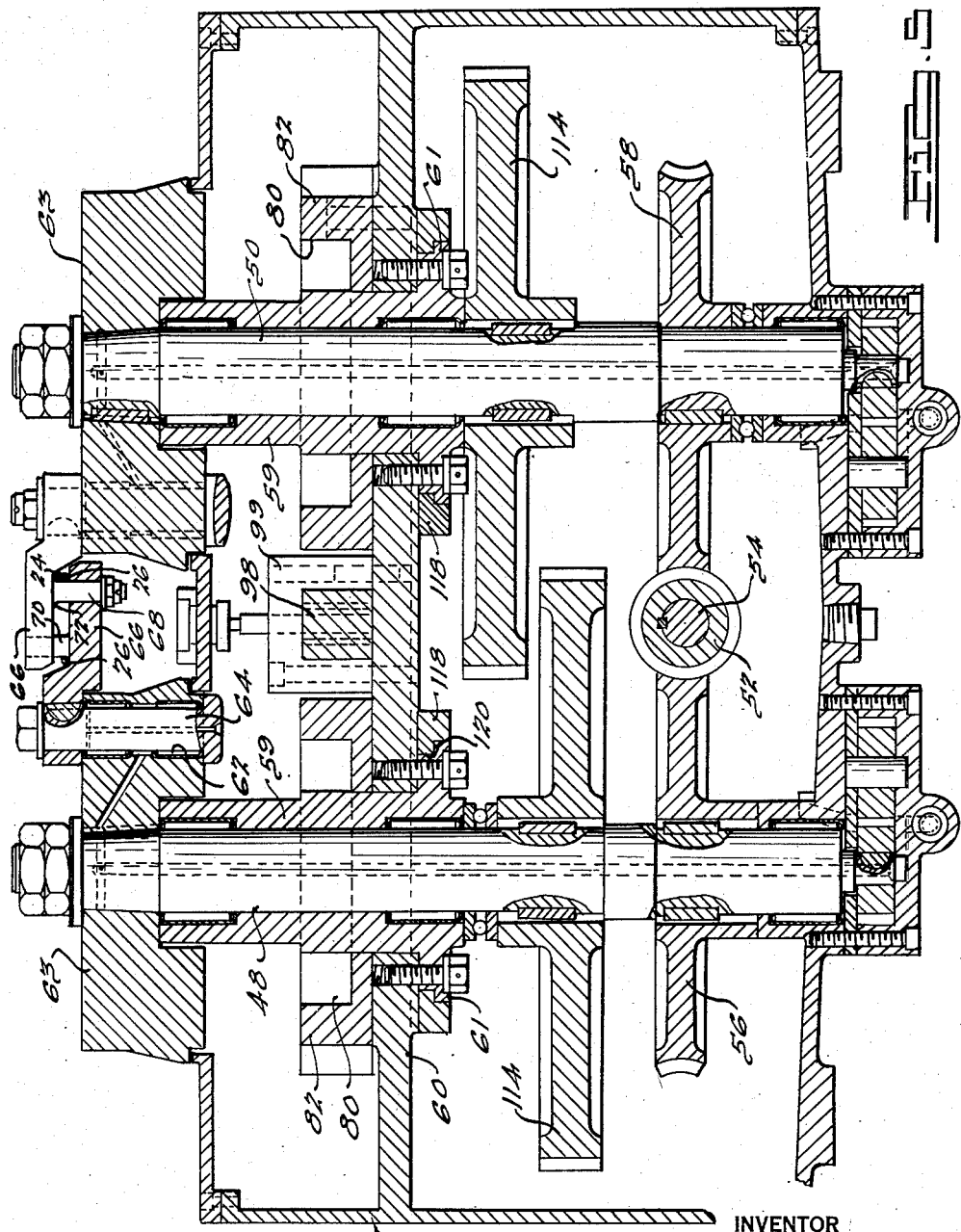

Dec. 4, 1945.     H. W. WILKINS     2,390,283
SPRING FORMING MACHINE
Filed Sept. 9, 1942     13 Sheets-Sheet 5
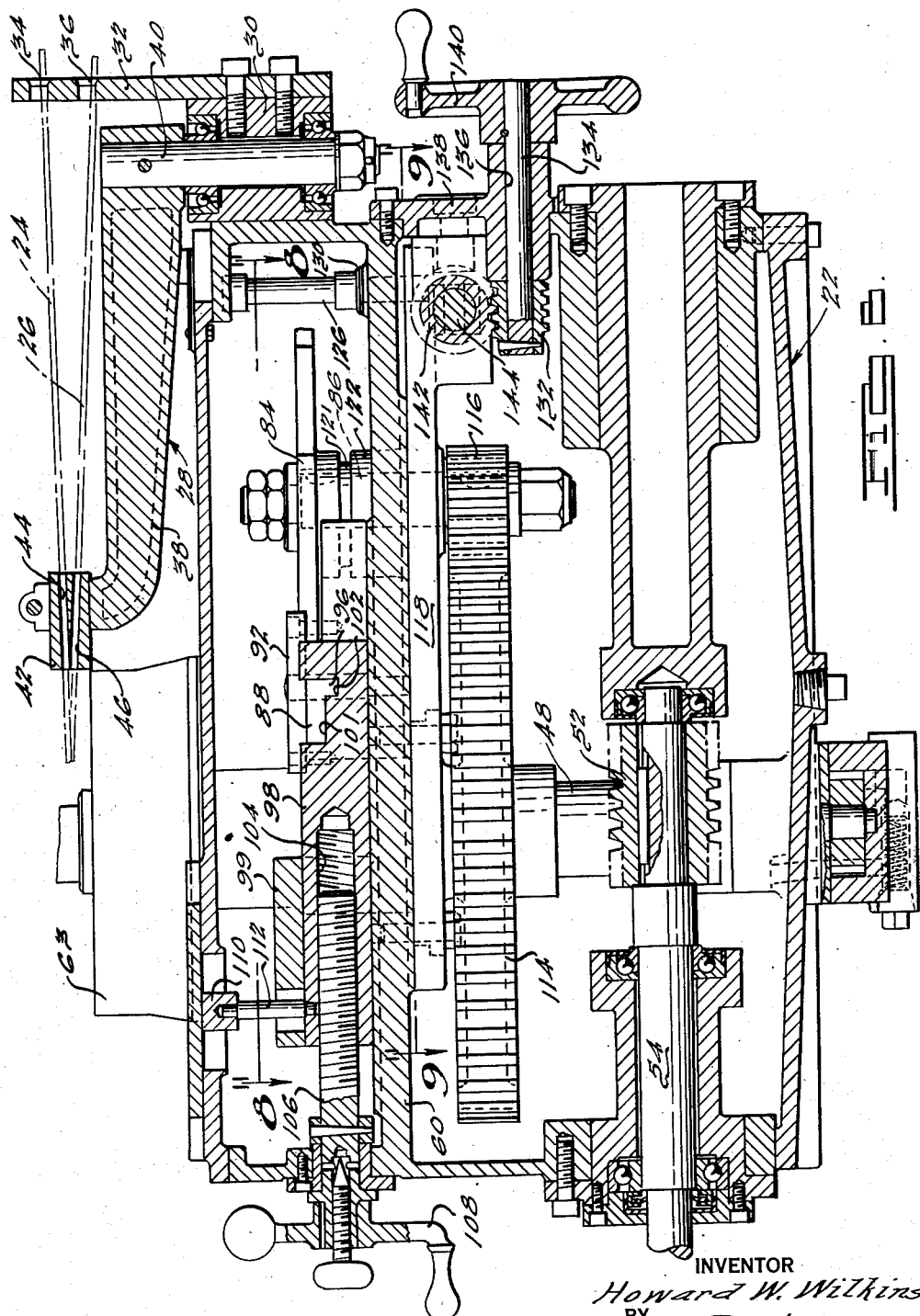
INVENTOR
*Howard W. Wilkins.*
BY
*Harness, Dickey & Pierce*
ATTORNEYS.

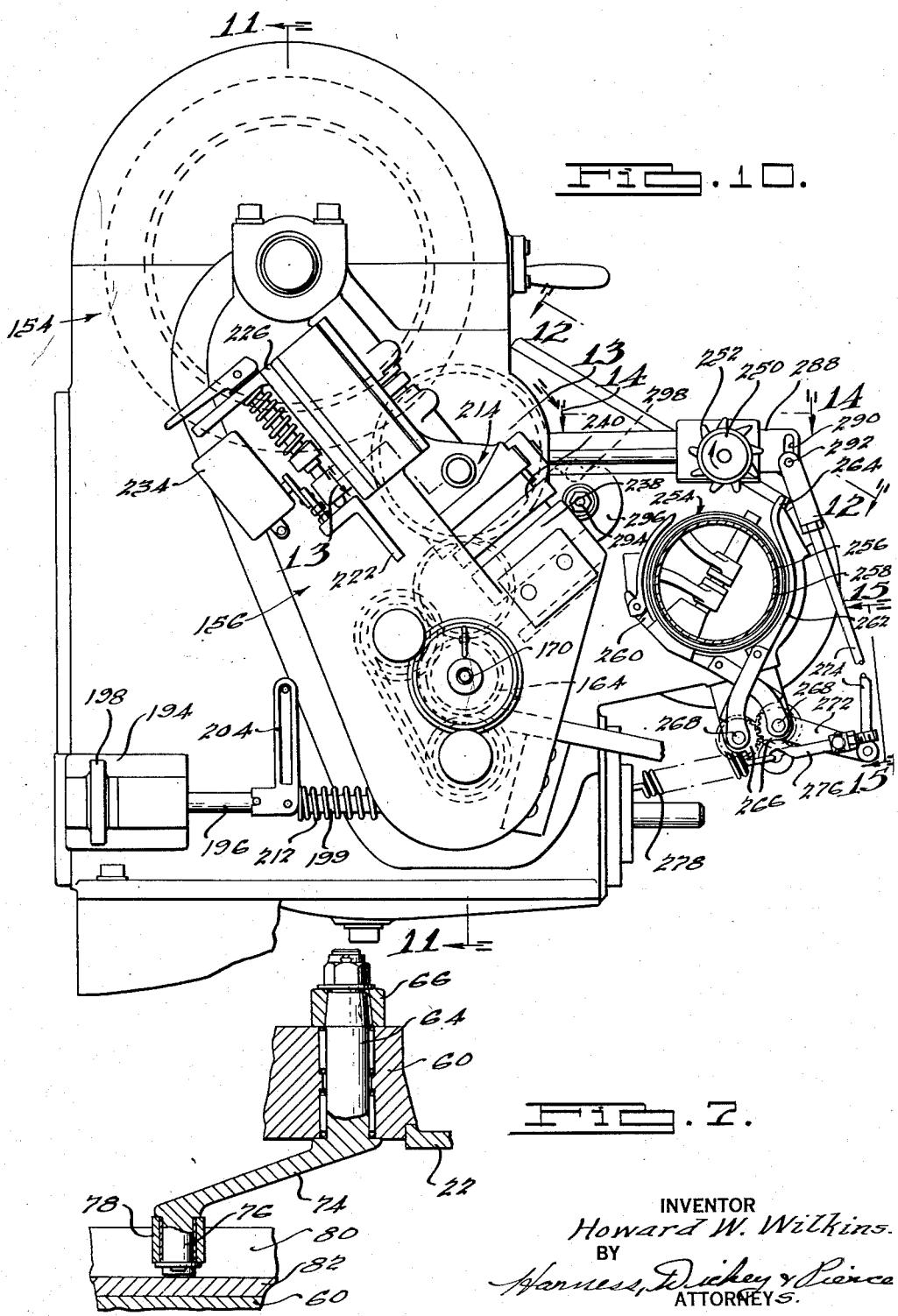

Dec. 4, 1945.   H. W. WILKINS   2,390,283
SPRING FORMING MACHINE
Filed Sept. 9, 1942   13 Sheets-Sheet 7
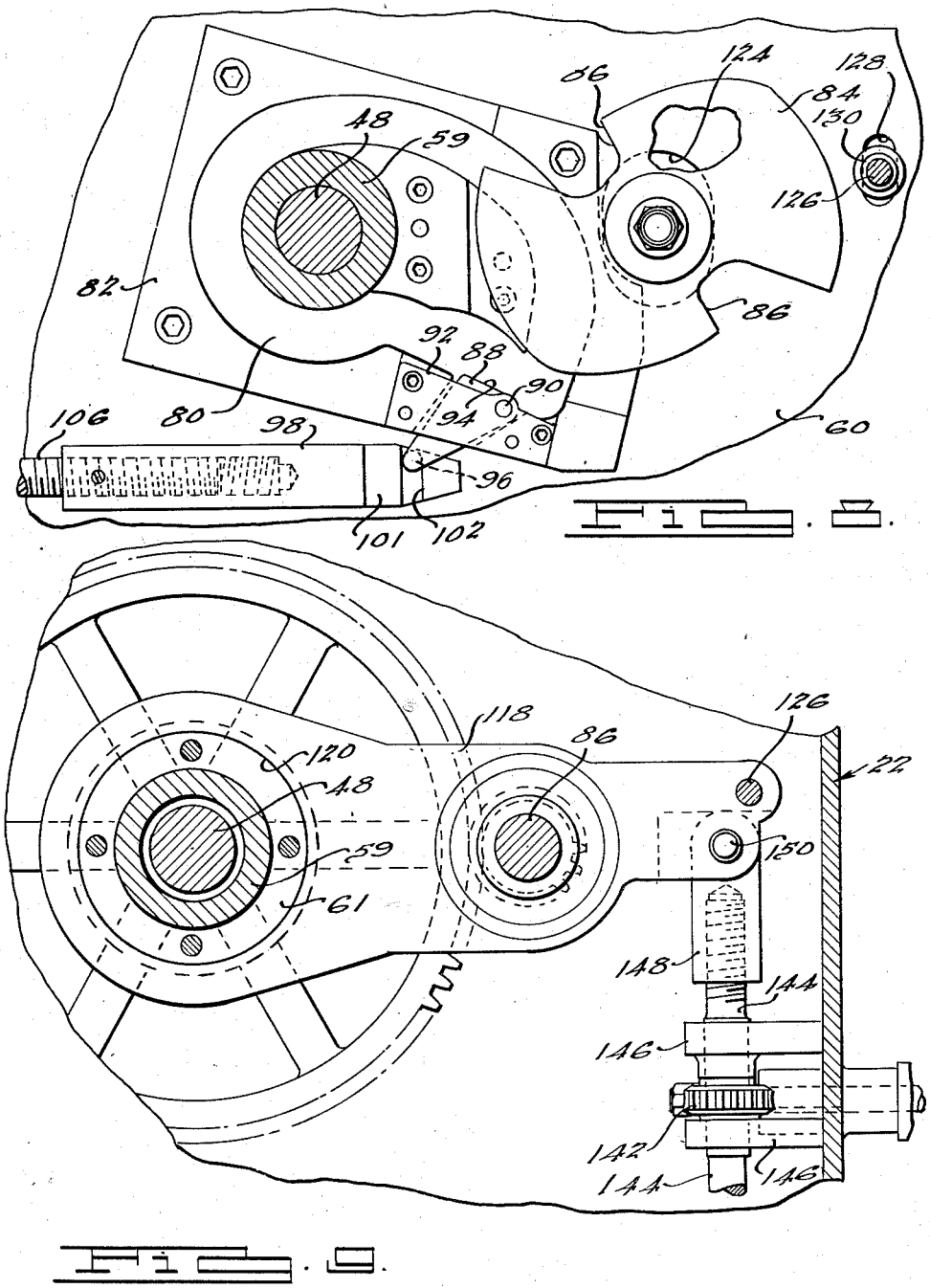
INVENTOR
Howard W. Wilkins.
BY
Harness, Dickey & Pierce.
ATTORNEYS.

Dec. 4, 1945.　　　H. W. WILKINS　　　2,390,283
SPRING FORMING MACHINE
Filed Sept. 9, 1942　　　13 Sheets-Sheet 8

INVENTOR
Howard W. Wilkins.
BY
Harness, Dickey & Pierce
ATTORNEYS.

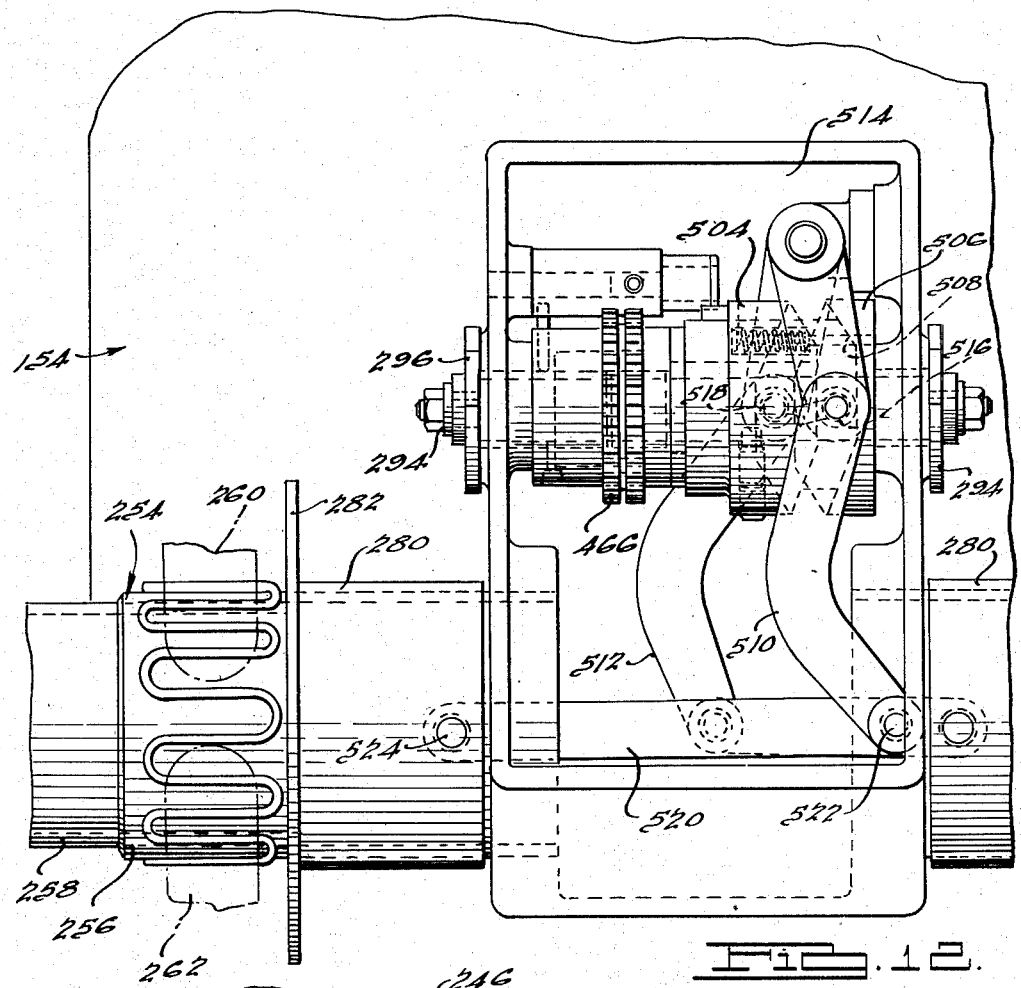
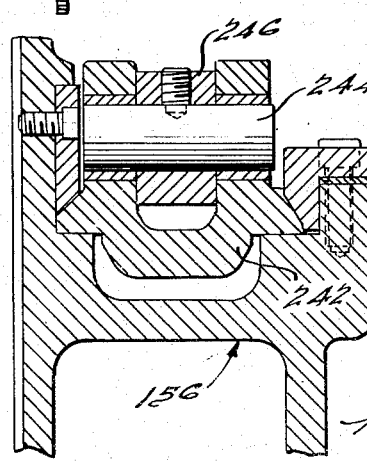

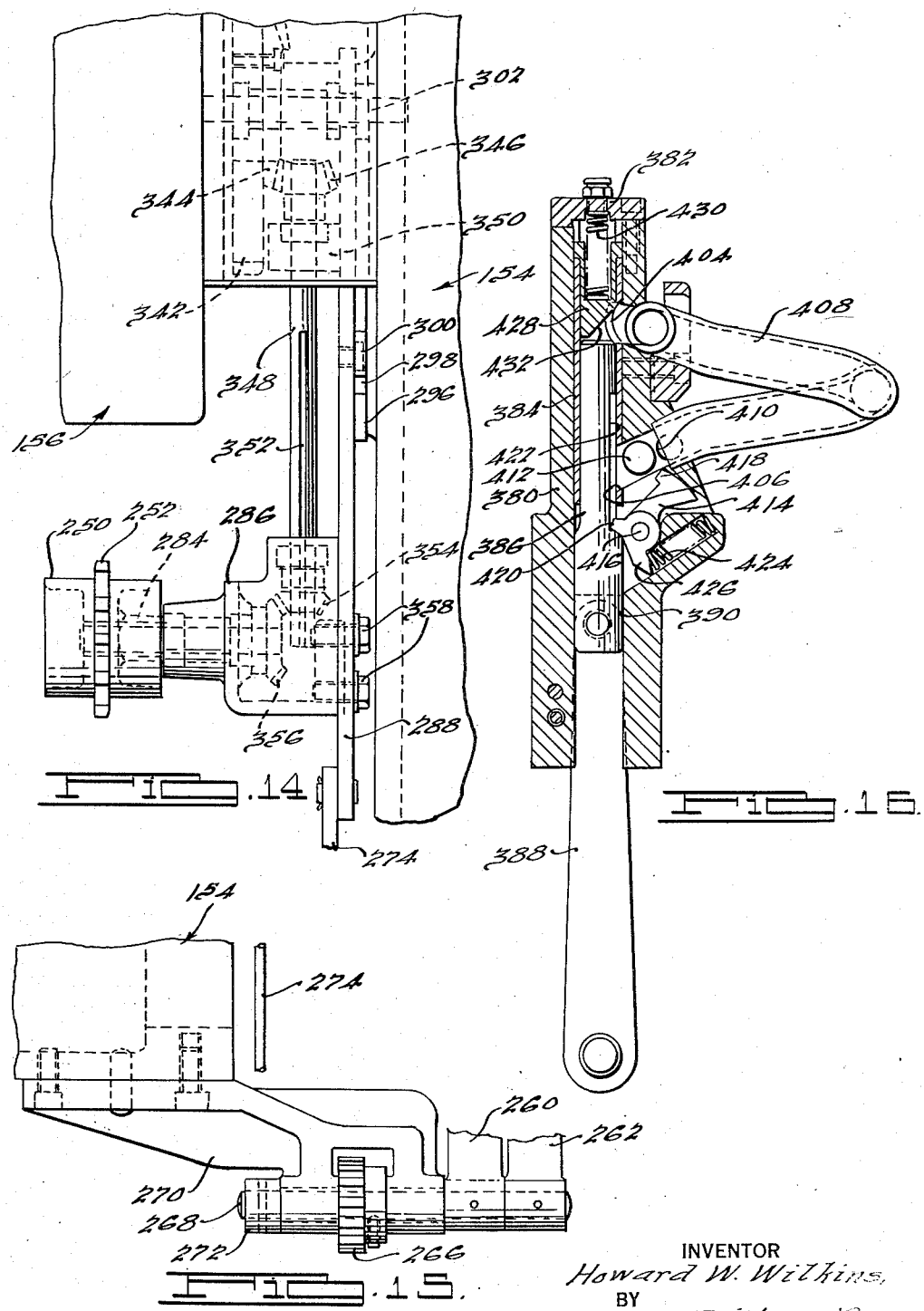

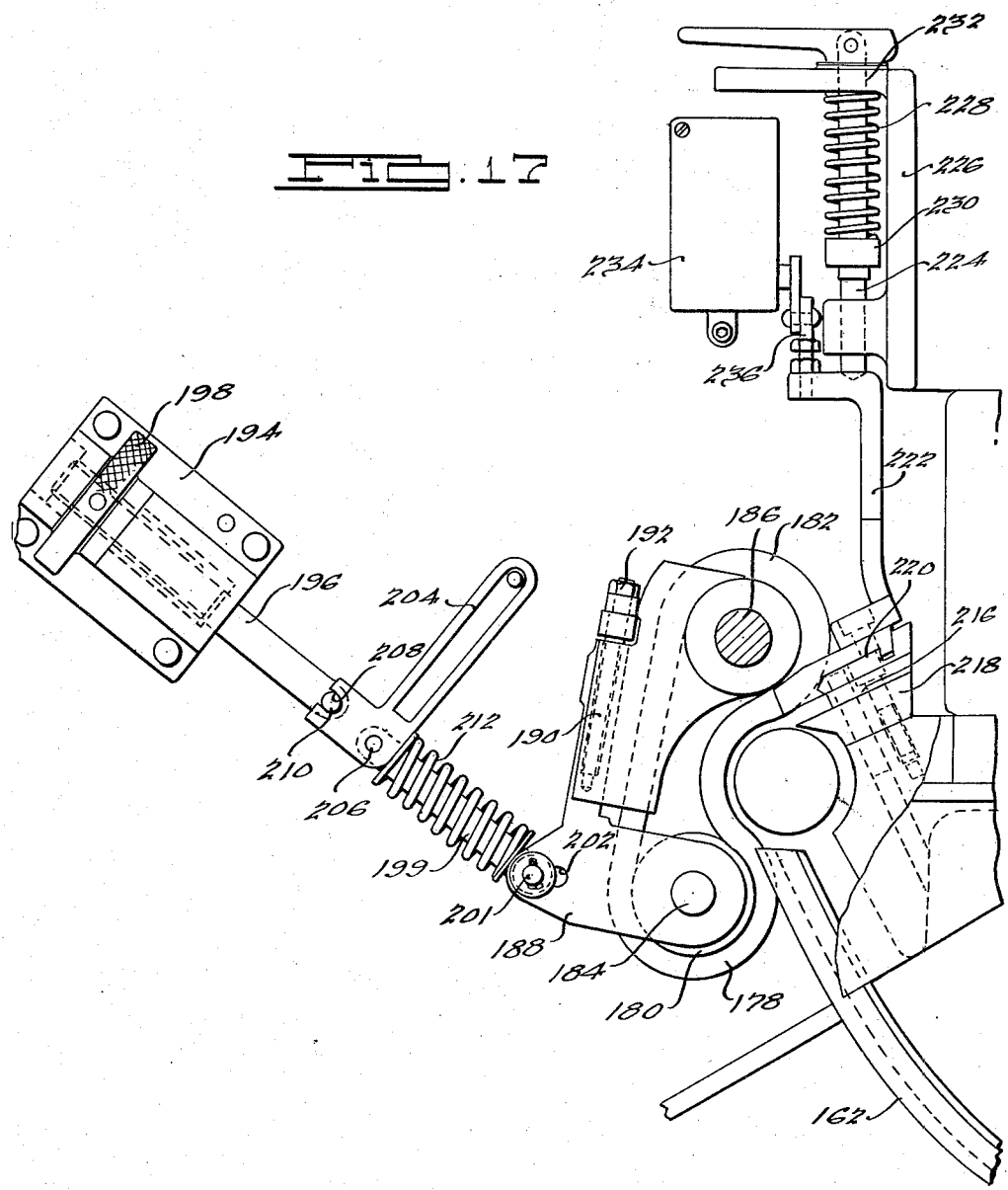

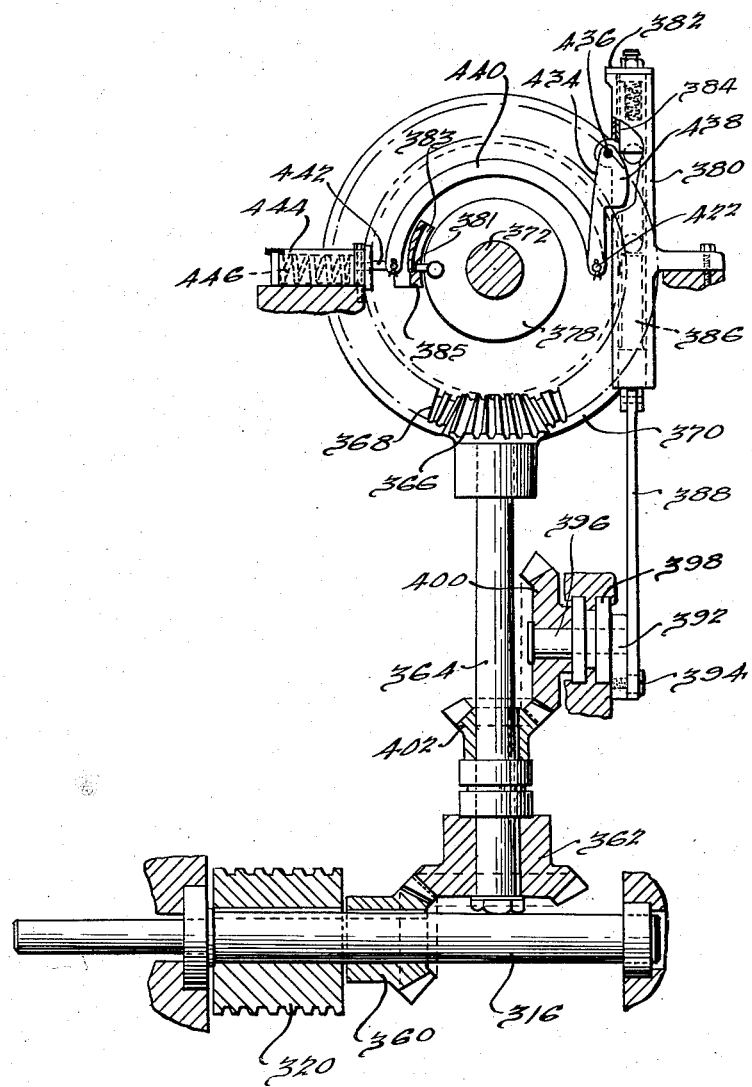

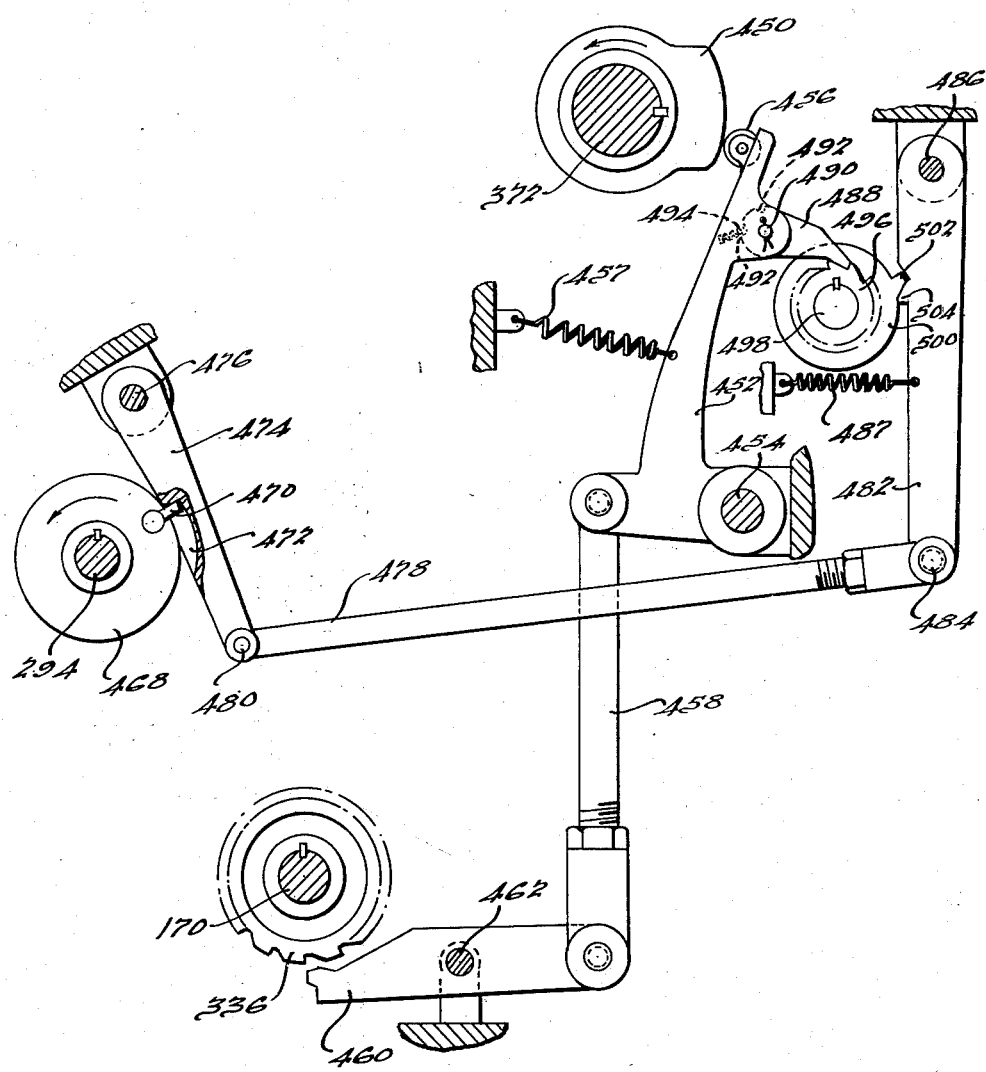

Patented Dec. 4, 1945

2,390,283

UNITED STATES PATENT OFFICE 2,390,283

SPRING FORMING MACHINE

Howard W. Wilkins, Warren, Mich., assignor to The Murray Corporation of America, Detroit, Mich., a corporation of Delaware Application September 9, 1942, Serial No. 457,736

21 Claims. (Cl. 140—105)

The present invention relates to spring forming machines and particularly to machines of the type disclosed in Horton Patent No. 2,160,020, issued May 30, 1939.

One of the primary objects of the present invention is to provide improvements in machines of the type mentioned whereby production may be speeded up materially.

Another object of the invention is to provide improvements in machines of the type mentioned in which the forming, cutoff, and stacking in bundles are automatically accomplished in the machine and in which the various operations are accurately coordinated.

A further object of the invention is to provide improvements in the control of the cutoff so that various lengths of spring may be cut off through actuation by a simple control means.

A further object of the invention is to provide improvements in the means for forming the convolutions in the type of spring formed in the above mentioned Horton patent.

A further object is to provide a novel stacking mechanism in which the spring elements of predetermined length are received after the forming and cutoff and are stacked into bundles for easy handling.

Other objects of the invention will become clearly apparent from the following specification, the drawings relating thereto, and from the claims hereinafter set forth.

In the drawings, in which like numerals refer to like parts in the several different views:

Fig. 5 is an enlarged, cross-sectional view taken substantially along the line 5—5 of Fig. 4;

Fig. 6 is an enlarged, cross-sectional view taken substantially along the line 6—6 of Fig. 4;

Fig. 7 is an enlarged, cross-sectional view taken substantially along the line 7—7 of Fig. 4;

Fig. 8 is a cross-sectional view taken substantially along the line 8—8 of Fig. 6;

Fig. 9 is a cross-sectional view taken substantially along the line 9—9 of Fig. 6;

Fig. 10 is an enlarged, side elevational view of the structure shown to the left of Fig. 1 and illustrating such structure in greater detail;

Fig. 12 is an elevational view, with the cover removed, taken substantially along the line 12—12 of Fig. 10;

Fig. 13 is a cross-sectional view taken along the line 13—13 of Fig. 10;

Fig. 14 is a plan view taken substantially along the line 14—14 of Fig. 10;

Fig. 15 is a partial elevational view taken substantially along the line 15—15 of Fig. 10;

Fig. 16 is a side elevational view of the cut-off control actuating mechanism;

Fig. 17 is a side elevational view illustrating the details of the elements employed to put the permanent set in the wire;

Fig. 18 is a diagrammatic view illustrating the timing mechanism and associated elements for controlling the cut-off; and Fig. 19 is a diagrammatic view illustrating the mechanism for stopping the feed during cutting and for controlling the discharge on the stacking mechanism.

Figure 1:
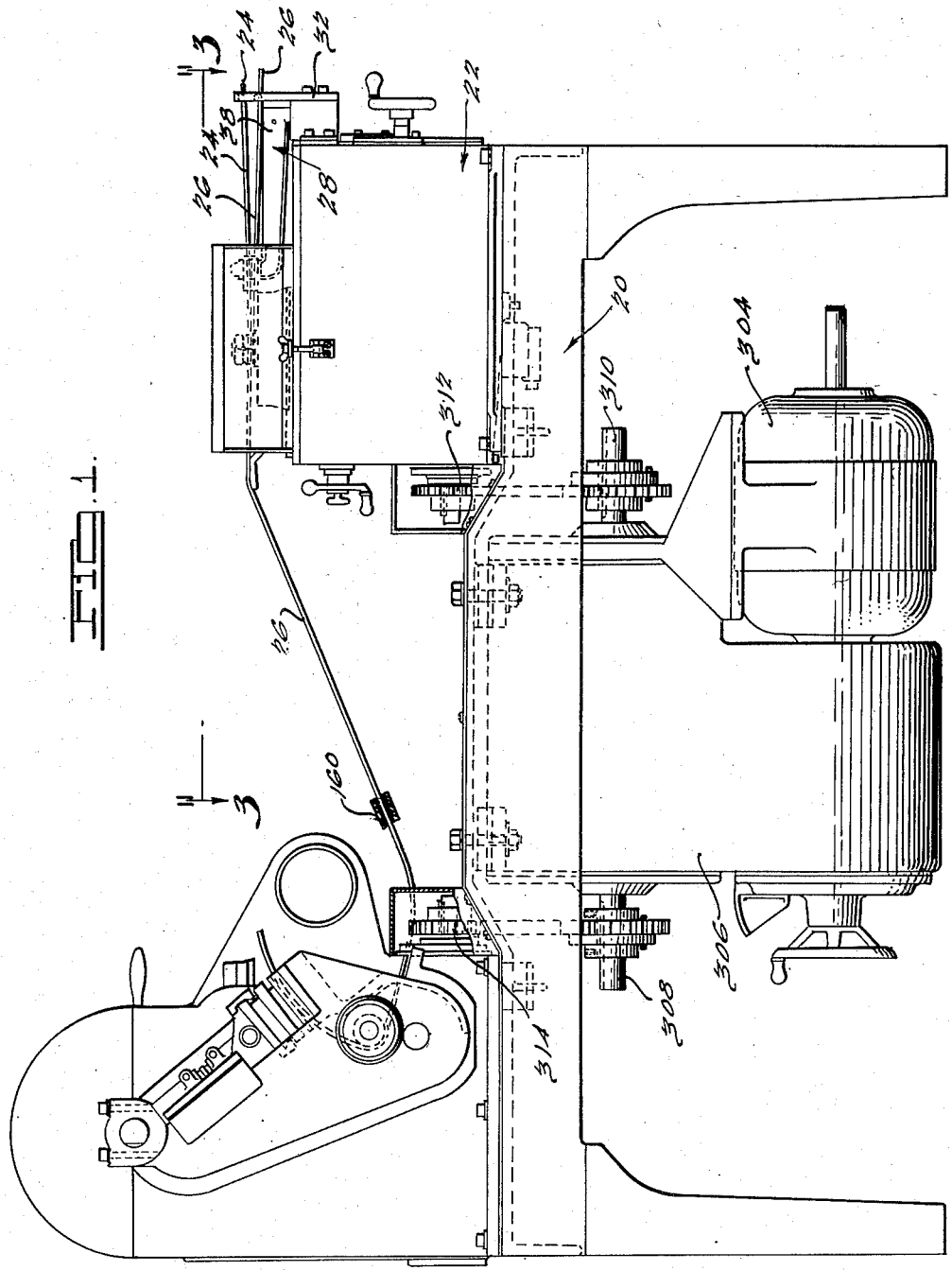
Figure 1 is a partial side elevational view, with parts in cross-section, of a wire forming machine embodying features of the present invention.
Figure 2:
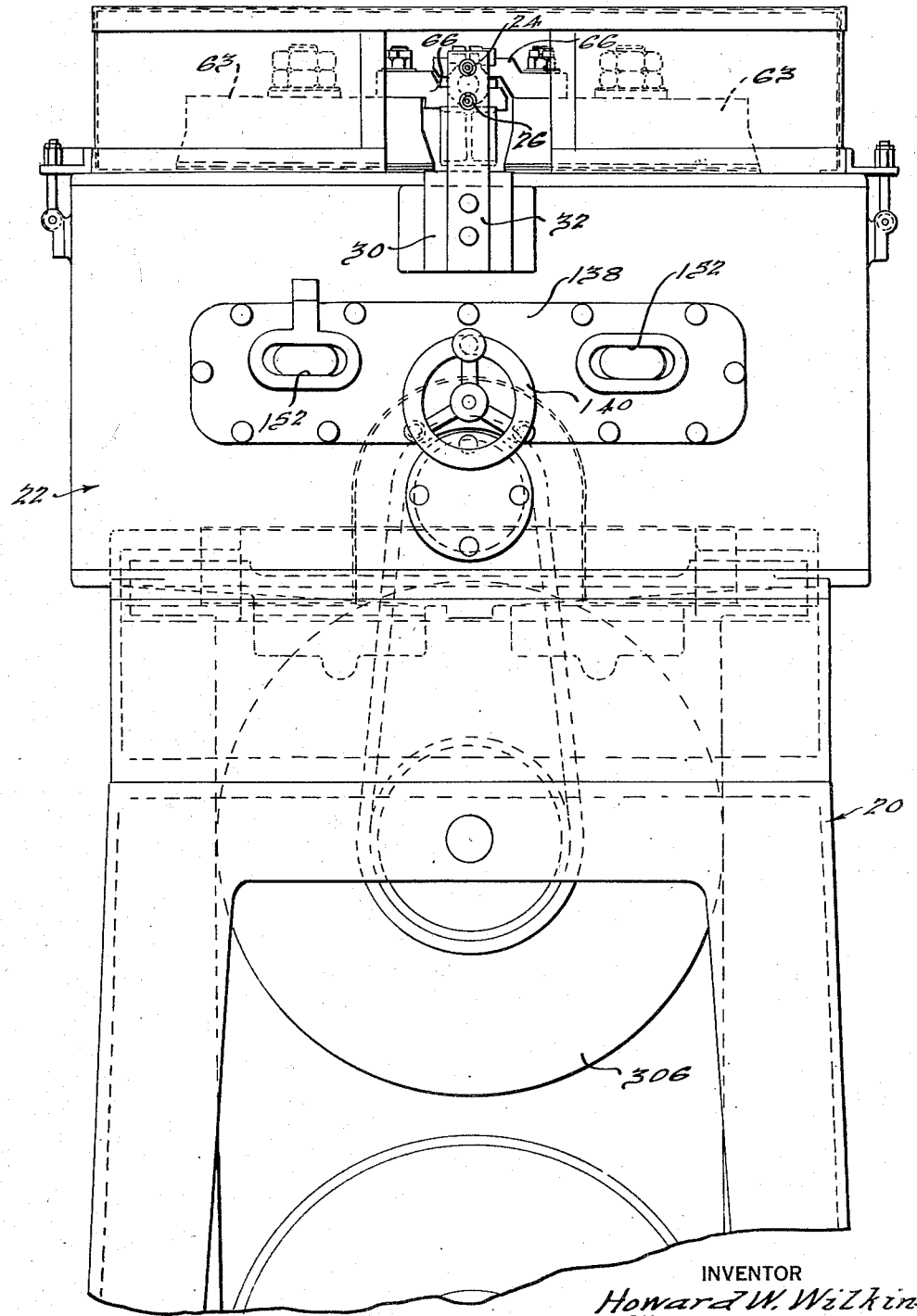
Fig. 2 is a righthand elevational view of the machine shown in Fig. 1.

In general, according to the present invention, a machine is provided in which a plurality of superimposed strands of wire are simultaneously engaged by a plurality of cam arms carried about spaced centers and arranged to move alternately across the path of wires to bend them first in one direction and then in another to form the wires into sinuous shape. Each of such strips of sinuously shaped wires thus formed is then fed through form rollers to provide a set thereto on a predetermined smaller radius, which radius is smaller than the arc that the wire elements assume when placed in use. The strip is then fed through a cutting device which is intermittently actuated to sever the strip into predetermined lengths. The spring elements of predetermined length are then gathered in bunches which may be removed from the machine when a given number of such elements have been collected.

Referring to the drawings for a more complete understanding of the invention and referring particularly to Figures 1 through 7 thereof, the mechanism for continuously bending the wire first in one direction and then the other to form the wires into sinuous shape is illustrated. The machine includes a mounting standard generally indicated at 20 which is in the general form of a table and which has a housing generally indicated at 22 mounted on one end thereof. Such housing 22 serves to house the mechanism for continuously forming the strands of wire into sinuous form.

The strands of wire 24 and 26 are fed from a suitable source of supply, which may be coils of such wire suitably mounted adjacent the machine, through guide means generally indicated at 28. Such guide means 28 includes a mounting block 30 which is mounted on the trailing face of the housing 22. An upstanding guide plate 32 having superimposed guide eyes 34 and 36 is fixed to the outer face of the block 30. The strands of straight wire 24 and 26 are received through the guide eyes 34 and 36, respectively. An elongated guide arm 38 is pivotally mounted to the guide block 30 adjacent the rear end thereof by means of a pivot shaft 40. Such pivot shaft 40 is received through a vertical bore formed in the member 30 and the upper end of the shaft 40 is pinned to the arm 38. Suitable roller bearings are provided in the block 30 for mounting the shaft 40 therein, and a nut is threaded to the lower end of the shaft for securing it against axial displacement. The arm 38 projects away from the guide plate 32 and has an upwardly turned front end to which is fixed a guide element 42. Such guide element 42 is formed with longitudinally extending, converging guide apertures 44 and 46, which are adapted to receive therethrough the strands of straight wire 24 and 26, respectively.

As the strands of wire leave the guide element 42, they are received by the forming means in which both of the wire strands 24 and 26 are simultaneously bent back and forth to give the wires the sinuous form. Such forming means includes a pair of transversely spaced, vertical shafts 48 and 50, which are mounted within suitable bearings provided in the housing 22. The shafts 48 and 50 are driven by a worm 52, which is keyed to a drive shaft 54, through worm wheels 56 and 58, respectively.

The shafts 48 and 50 project upwardly within the housing 22 through stationary sleeves 59, which are fixed to a horizontal portion 60, forming an integral part of the housing 22 through an annular flange 61. Each of the shafts 48 and 50 has a circular plate member 63 secured thereto so that such plates 63 are driven through the shafts 48 and 50. Each of the plates 63 is formed with a plurality of annularly spaced openings 62 therethrough, which are adapted to pivotally receive therein pivot shafts 64 of the forming elements which are generally in the form of bell cranks. Each of such forming elements includes a laterally projecting forming arm 66, which has its inner end keyed to the upper end of its pivot shaft 64 for rotation therewith. The arms 66 for the shafts 48 and 50 are off-set and are reversed in position with respect to each other, as shown best in Fig. 5, so that they pass in superimposed relation to each other with a space therebetween. The lower arms 66 each have upwardly projecting pins 68 mounted on the outer ends thereof, and the upper arms 66 have similar depending pins 70 mounted on the outer ends thereof. The pins 70 lie adjacent the upper surfaces of the lower arms 66 and the pins 68 lie adjacent the under surfaces of the upper arms 66. The outer ends of the pins 68 and 70 are each outwardly flared, as indicated at 72 for the purpose of properly positioning the wires 24 and 26 as they are engaged by the pins 68 and 70.

The arms 66 rotate along with their respective plates 60 and such arms are pivoted about their shaft 64 so that the pins 68 and 70 follow a definite path by means of depending arms 74 which may be formed integrally with the pivot shaft portions 64. The arms 66 may be fixed in a predetermined rotative position with respect to the pivot portions 64 so that such arms 66 will have a predetermined definite angular relationship with the depending arms 74. Each of the arms 74 has a downwardly extending cylindrical end portion 76 which has a bearing sleeve 78 fixed thereto.

The downwardly projecting portion 76 of each of the arms 74, for each of the shafts 48 and 50, is received within a cam groove 80 provided in cam plates 82. Each of such cam plates 82 is secured to the horizontal portion of the casing 22. The cam grooves 80 are of predetermined contour so as to cause the forming arms 66 to follow predetermined paths as they rotate with the plates 63. Such arms 66 follow substantially the same paths as those disclosed in the above mentioned Horton patent.

As in the Horton patent above referred to, kicker means are provided for engaging that portion of the rollers 78 above the upper edge of the cam slot to force the travel of the arms around the sharp lip portion of the cam slot when the projections 68 and 70 are in engagement with the wires. According to the present invention, such means include cam or kicker plates 84 provided with notches 84, there being one of such kicker plates 84 provided for the arms driven by shaft 88 and another kicker plate provided for the arms carried by shaft 50. Each of such plates 84 is keyed to a short shaft 86 to be driven thereby in synchronism with the drive of shafts 48 and 50. The rollers 78 are engaged in the notches 86 and are then engaged by the periphery of the cam plate 84 to cause such arms to follow a predetermined path. The peripheral edge of the cam plates is of a predetermined development to obtain the path of movement desired. Each plate is a twin plate, i. e., each plate has a pair of developed surfaces so that for one revolution of the cam plate two arms are engaged in succession.

The shape of the adjacent convolutions of the wires is controlled by the points of engagement of the wires by the projections on the arms, i. e., by the relative positions of the arms during engagement. In order to adjustably vary the shape of such convolutions, that is with the adjacent convolution disposed closely together or disposed a greater distance apart, means are provided for varying the path of movement of the arms during their engagement with the wires. Such means include means for varying the shape of the cam groove 80 along a portion thereof and also means for varying the relative position of the shafts 86 with respect to its shaft 48 and 50, which in effect varies the position of the cam plates 84. In varying the position of the cam plates 84, the engagement of such with the forming arms is varied which in cooperation with varying the cam grooves 80 will vary the shape of the convolutions.

The shape of the cam grooves 80 is varied by means including a movable element 88, as best shown in Figs. 6 and 8. Such element 88 is generally triangular in shape and has one corner thereof pivotally connected to the cam plate 82 by means of a pivot pin 90. The plate 88 extends through a slot in one wall of the cam plate 82 and has a cover plate 92 overlying it and fixed to the plate 82. One edge 94 of the element 88 forms one edge of the cam track and is engaged by the roller of one of the arms to control the path of such arm. The opposite end of the arm 88 projects laterally beyond the side of the cam plate 82 and has a depending integral projection 96 formed thereon.

The position of the guide edge 94 is varied by pivoting the element 88 about the pivot pin 90. In order to control such pivotal movement, a slidable adjusting bar 98 is mounted on the horizontal portion 60. Such bar 98 is slidable through an aperture in guide block 99 which may be suitably secured to the horizontal portion 60. The adjusting block 98 has a recess 101 formed therein adjacent one end thereof and also has a transverse slot 102. The projection 96 is received within the transverse slot 102 and the recess 101 permits clearance for the arm 88 as the member 98 is moved with respect thereto.

The member 98 has a tapped opening 104 formed through one end thereof and receives therein a screw 106. The screw 106 is rotatably mounted within bearings through one of the walls of the casing 22 and has a hand crank 108 secured to the outer end thereof. It will be appreciated that by rotating the screw 106, the member 98 is caused to move longitudinally with the guide block 99. With such movement, the projection 96 may slide with the slot 102 which causes pivotal movement of the element 88 to vary the position of the edge 94 with respect to the cam groove 80. An indicator block 110 may be connected to the member 98 through a mounting post 112 which extends through an elongated aperture in the guide block 99. The indicator 110 may project through an elongated opening or window in the top of casing 22 and may be provided with suitable marking which corresponds to the marking on the top of the housing 22 to indicate the extent of the adjustment.

While the specific means for varying the shape of the cam track has been described for one of the sets of arms only, it will be understood that the same means are provided for the other set. The projection 96 for the other set is received within the slot 102 so that both are adjusted simultaneously.

Each of the cam plates 84 is driven in synchronism with its shaft 48 or 50 by means of a gear 114. One of such gears 114 is keyed to the shaft 48 for rotation therewith, and the other gear 114 is keyed to the shaft 50 and for rotation therewith. Each of the shafts 86 has a pinion 116 keyed thereto which meshes with one of th gears 114. Thus the cam plates 84 are driven in synchronism with the shafts 48 and 50.

The shafts 86 are each mounted for adjustment about the shafts 48 and 50, respectively. The means for so mounting the shafts 86 are best shown in Figs. 5, 6, 8, and 9. Each of such shafts 86 is mounted to a mounting plate 118. Such mounting plate 118 is provided with an aperture 120 therethrough which is concentric to the shaft 48 or 50, and which is formed with an annular shoulder which is complementary in shape to an annular shoulder provided on the flange 61 so that such plate 118 is mounted at one end by the flange 61 and may rotate about shaft 48 or 50. The shaft 86 is provided with a shoulder 121 which rests upon a boss 122 formed integrally with the plate 118. The shaft 86 projects downwardly below the plate 118 and has the pinion 116 keyed thereto and mounted thereon by means of a nut. The boss 122 and the shaft 86 project through an elongated aperture 124 which is formed in the horizontal portion 60 and permits limited movement of the shaft 86 about shaft 48 or 50 as a center.

The remote edge of the plate 118 is supported by a post 126 which has a lower end threaded into the plate 118 and which projects through an elongated aperture 128 in portion 60. The post 126 is provided with an annular shoulder 130 which bears against the upper surface of the horizontal portion 50 and serves to assist in supporting the plate 118.

The means for adjustably varying the positions of the shafts 86 so that both of the kickers 84 may be simultaneously adjusted includes a worm 132 which is keyed to a shaft 134. Such shaft 134 extends through an aperture 136 and a mounting plate 138. Such mounting plate 138 is mounted to the rear face of the casing 122. A hand wheel 140 is keyed to the shaft 134 for turning the worm 132.

A worm wheel 142 is keyed to a transverse shaft 144, which extends in opposite directions from the worm wheel 142, and which may be mounted within suitable mounting brackets 146 on the inner face of the mounting plate 138. The opposite ends of the shaft 144 are threaded and such threaded ends are threadably received within tapped openings in clevises 148. There is one of such clevises provided for each of the plates 118 and the outer end of each of such clevises is pivotally connected to the outer end of its plate 118 by means of a pivotal pin 150. The threads on the member 144 are such that when the hand crank 140 is turned in one direction, the plates 118 are drawn together, while, when the hand wheel is turned in the opposite direction, the plates 118 are separated.

An indicator means may be provided on each of the clevises 148 and such means may project outwardly through an aperture or window 152 provided in the mounting plate 138 so that the extent of the adjustment may be seen. It will be appreciated that as the shafts 86 are rotated about the shafts 48 and 50, as the centers, the pinions will, of course, remain in mesh with the driving gears 114.

Figure 4:
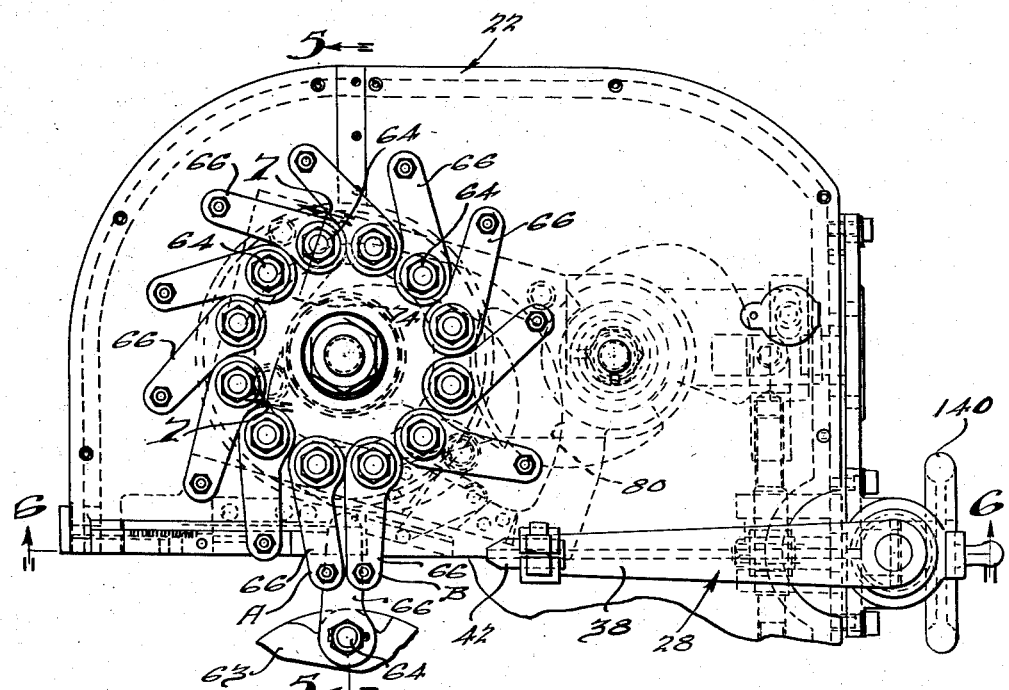
Figure 4 is an enlarged, plan view of a portion of the structure shown in Fig. 3, showing certain of the parts in elevation and showing the operating structure in greater detail.

The adjustment of the element 88 affects the position of the arms 66 particularly when such arms are in the position indicated by A in Fig. 4; and the adjustment of the shafts 86 affects the position of the arms 66 when they are in the position indicated at B in Fig. 4. By making these relative adjustments, it will be appreciated that the arms 66 may be disposed closely together when in such positions A and B, or may be more separated when in such positions A and B which will have the effect of varying the shape of the convolutions formed in the wires.

After the strands of wire 24 and 26 leave the mechanism which forms the convolutions therein, such strands are passed through mechanisms in which the permanent set is placed therein, the wire is cut off to lengths, and such cut-off lengths are stacked or gathered into bunches. There is a setting, a cutoff, and a stacking mechanism provided for each of the wires 24 and 26 and such mechanisms for both wires are identical in structure. A description of one will, therefore, suffice for an understanding of the construction and operation of both.

Figure 3:
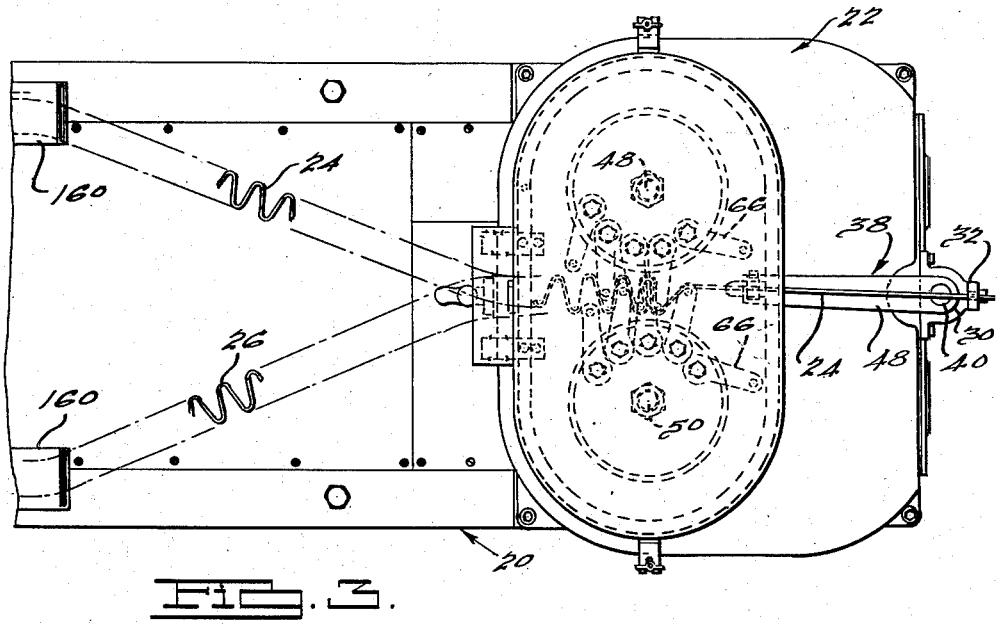
Fig. 3 is a top plan view taken substantially along the line 3—3 of Figure 1.

The mechanism for setting, cutting-off and gathering the strands of wire is mounted on the standard 20 and includes a central housing generally indicated at 154, having a casting generally indicated at 156, removably mounted to one side thereof, and another similar casting 158 removably mounted to the other side thereof. The housing 154 serves to mount the operating and timing mechanisms. The casting 156 serves to mount the setting, cutting-off and gathering mechanism for the wire 26 and the casting 158 serves to mount the setting, cutting-off and gathering mechanism for the strand 24. The strands 24 and 26 are, therefore, separated after they leave the convolution forming mechanism, as best shown in Fig. 3, and are passed through guides 160. One of such guides 160 leads the wire 26 to the mechanism within the casting 156, and the other guide 160 leads the wire 24 to the mechanism mounted on casting 158.

Figure 11:
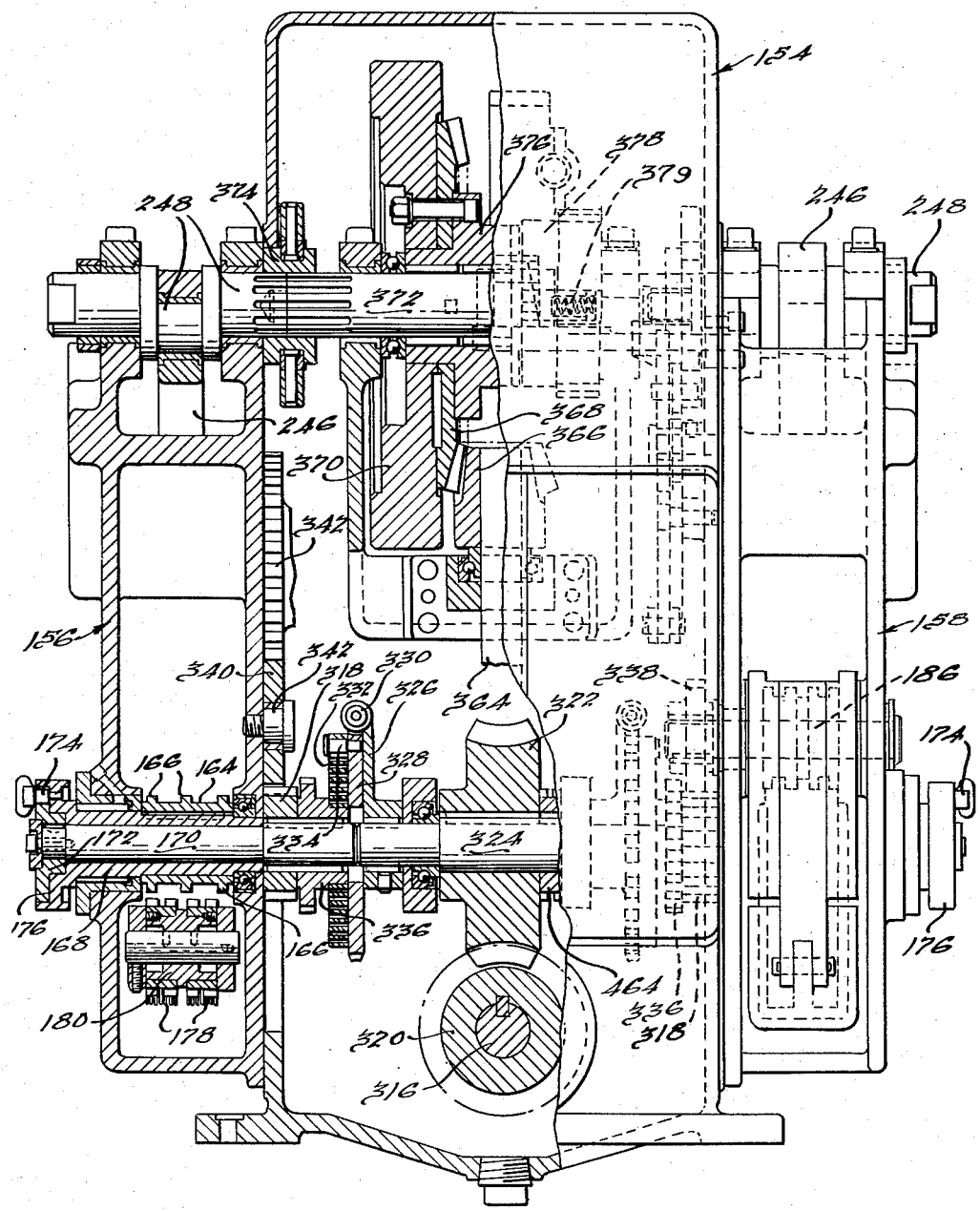
Fig. 11 is an enlarged, cross-sectional and elevational view taken substantially along the line 11—11 of Fig. 10.

The mechanism for placing the permanent set in the wire, which set is on an arc less than the arc which the wire assumes when in use, is best shown in Figs. 10, 11, and 17. The wire is led to the setting mechanism by a guide shoot 162. Such wire is then trained about a driven forming roller 164. Such forming roller 164 has a plurality of teeth 166 formed in the periphery thereof and such teeth are adapted to engage between the convolutions of the wire so that the wire lays against the peripheral surface of the roller 164. Such roller 164 is keyed to a drive sleeve 168 which is mounted within the housing 156 and such sleeve receives therethrough a drive shaft 170. The shaft 170 is connected to the sleeve 168 through an end plate 172 and a shear pin 174. The sleeve 168 has an annular flange 176 adjacent the end plate 172 and such flange 176 is provided with a plurality of apertures therein so that the shear pin 174 may engage in one of the apertures to provide a driving connection between the roll 164 and the shaft 170. The plurality of apertures are provided so that the roll 164 may be suitably adjusted with respect to the drive. In the event of a wire jam in the forming roll, the pin 174 will shear off to prevent damage to the rest of the mechanism.

The wire 26 is bent around the roll 164 and is urged thereagainst by means of endless link belt 178. Such chains are trained about rollers 180 and 182 in driving engagement therewith. The rollers 180 and 182 are keyed on shafts 184 and 186, respectively. The shaft 186 is mounted within suitable bearings in the casting 156 and is driven in a manner to be described hereinafter. The shafts 184 and 186 are mounted for adjustment with respect to each other so as to control the tension and contour of the forming belt 178. To so mount the shafts 184 and 186, a pair of yokes from mounting elements 188 and 190 are provided with the shaft 184 mounted in the yoke of member 188 and the shaft 186 mounted in the yoke of member 190. The members 188 and 190 are mounted for sliding movement with respect to each other by means of screws or bolts 192 which are mounted on one of the members and received in tapped openings in the other so that by turning such screws 192 the members 188 and 190 may be moved with respect to each other for varying the position of the shafts 184 and 186.

It will be appreciated that the wire 26 passes between the belt 178 and the roller 164 and is urged thereagainst by the belt so that a permanent set is placed in the wire.

In order to vary the force at which the wires are urged against the forming roller, and to take up any shock that may be placed on the belt 178, an adjustable mechanism is mounted on the side of the casing 154 in the position shown in Fig. 10. Such mechanism includes a mounting plate 194 which may be fixed on the casing 154; and such mounting plate has a screw link 196 projecting through one end thereof in which the inner threaded end thereof passes through a nut 198. Such nut 198 is rotatably mounted on the bracket 194 and by turning the nut, the link 196 may be adjusted toward and from the forming mechanism. Another link 199 has one end thereof connected to the member 188 by means of a pin 201 which is received within an elongated slot 202 formed in the member 188. The link 199 is connected to the link 196 through a toggle link 204. Such toggle link 204 is pivotally connected to the link 199 by means of a pin 206 and is connected to the link 196 through a pivot slot 208 and a pin 210. A compression spring 212 embraces the link 199 and has one end abutting against the toggle link 204 and the opposite end abutting against the member 188.

The proper adjustment may be set through a nut 198 and after the proper setting is reached, the belt 118 may be swung away from the forming roller by breaking the toggle connection through turning the link 204, without disturbing the adjusted setting. With the toggle link in its operating position, the compression spring 212 and the connection between the link 199 and the member 188 through the elongated slot 202 permits a limited movement of the wheel 180 away from the forming roller 164 in the event of a shock load on the chain.

It will be appreciated that the wire is fed through the machine at high speeds and that after the wire leaves the setting mechanism just described, it passes to and through the cutoff mechanism generally indicated at 214 in Fig. 10. The wire is stopped during the cutoff, and the movement of the setting mechanism is also timed to stop during the cutoff. In order to insure proper feed of the wire to the cutoff, and to prevent jamming, in the event that the cutoff is not proper, and in the event that the feed through the setting mechanism might continue, safety means are provided and are disposed adjacent the outlet side of the setting mechanism, as best shown in Figs. 10 and 17. As the wire leaves from between the roll 164 and chain around wheel 182, it passes through a guide slot 216 which is formed in a guide plate 218 having a movable cover plate 220 mounted thereon. Such cover plate 220 is mounted for movement upwardly and is resiliently urged downwardly through a depending mounting arm 222. The arm 222 is connected to the cover plate 220 and the upper end thereof bears against a pin 224 which is mounted for sliding movement within a bracket 226. The bracket 226 is mounted to the housing 156. The pin 224 is resiliently urged downwardly by means of a compression spring 228 which bears against a collar 230 fixed to the pin 224 and bears against the underside of a flange 232 formed on the bracket 226. The arm 222 is operatively connected to a limit switch 234 through an operating crank arm 236.

In the event that the wire jams as it passes through the conduit 215, such wire will be urged upwardly against the cover plate 220, which in turn will urge the arm 222 upwardly and operate the limit switch 224 to cut off the driving motor and thereby stop the machine.

As stated, the wire then passes to a cutoff mechanism. The cutoff mechanism here employed may be the same as that used in the Horton patent above referred to.

The cutoff mechanism 214 includes a pair of cooperating dies between which the wire passes. The lower of such dies is indicated at 238 and is stationarily mounted on the casting 156. The upper of such dies 240 is mounted for reciprocation on a slide 242 (Fig. 13). Such slide 242 is received within ways formed in the casting 156. The slide member 242 is pivotally connected through a pivot pin 244 with the lower end of a crank arm 246. The upper end of such crank arm 246 is pivotally connected to a crank shaft 248. Such crank shaft 248 is received within suitable bearings in the upper end of the casting 156 and is operatively connected to the driving mechanism for intermittent actuation in a manner that will be described in detail hereinafter.

The wire 26 is fed through its cut-off mechanism to a predetermined length before it is cut off. Before it is cut off, it is engaged by the driving or feed drum 250 (Figs. 10 and 14). Such feed drum 250 has a plurality of annularly spaced teeth 252, which are disposed at a slight inclination in the driving direction, and such teeth are adapted to engage between the convolutions of the wire. After such wire is engaged by the driven wheel 250 and is passed through the cut-off to its predetermined length, it is cut off; and such wheel then serves to feed the wire to a gathering mechanism, generally indicated at 254 (Figs. 10 and 12). It will be appreciated that at the time the wire is fed to the gathering mechanism it has been cut off into its predetermined length and a permanent set has been placed therein. Such wire tends to assume this set so that it tends to assume a closed loop, although the ends are somewhat separated.

The leading end is then fed downwardy by the wheel 250 to the gathering mechanism 254. Such gathering mechanism 254 includes a receiving drum 256 which is mounted to the central portion of the housing 154 and the cut-off lengths of wire are disposed therearound, as shown in Fig. 12. A bar 258 of reduced diameter is disposed adjacent the receiving portion 256 and is adapted to have the lengths of spring wire disposed thereon in bunches after a predetermined number have been gathered. Such bunches of elements are disposed on the reduced portion and may be readily removed from the free end thereof.

As the wires are deposited on the receiving portion 254, they are forced between embracing arms 260 and 262. The arm 262 is outwardly flared adjacent the top thereof, as indicated at 264, so as to receive the leading end of each of the wire elements as it is fed by the feed wheel 250 and guided around the receiving drum between the arms 260 and 262. Such arms 260 and 262 are disposed in crossed relationship with their lower ends fixed to mating gears 266. Such mating gears are mounted on suitable shafts 268, which in turn are mounted to a mounting bracket 270, which is fixed to the housing 154. The gear 266, which is associated with the shaft 260, has an operating link 272 fixed thereto. The opposite end of such link has a shaft 274 pivotally connected thereto. The link 272 also has a hook 276 fixed thereto intermediate the ends thereof, which hook has a tension spring 278 connected thereto and connected to the housing 154, so as to urge the link 272 in a clockwise direction. This resiliently urges the arms 260 and 262 to their closed position.

The arms 260 and 262 are adapted to be separated when the predetermined bunch of wires are removed from the receiving portion 256 and deposited onto the take-off portion 258. A reciprocable sleeve member 280 is slidably disposed over the portion 256 and has an annular flange 282, which is adapted to engage the bunch of wires and push them onto the take-off portion.

Means are provided for controlling the opening of the arms 260 and 262 in synchronism with the movement of the push-off member 280. Such means include the mounting for the drive wheel 250 and the elements associated with the operating means for the push-off member 280. The feed wheel 250 is keyed to a stub shaft 284 which is received within suitable bearings in an adjustable gear housing member 286, as shown in Fig. 14. Such housing member 286 is adjustably fixed to an elongated arm 288. The arm 288 is formed with an elongated notch 290 adjacent the outer end thereof, and such arm is connected to the rod 274 through the notch 290 by means of a pin 292. The elongated slot 290 will permit slight opening of the arms 260 and 262.

The push-off member 280 is actuated through a cam by a shaft 294 in combination with other elements to be described in detail hereinafter; and such shaft 294 has a cam element 296 keyed thereto, as shown in Fig. 12. The wheel 296 is formed with a notch 298 therein, which is adapted to receive a small disc or wheel 300. Such wheel 300 is rotatably mounted on the arm 288. When the shaft 294 is caused to rotate to operate the push-off member 280, the actuating member 296 is turned with the shaft; and the wheel 300 moves out of the notch 298 and is engaged by the periphery of the member 296 which pivots the arm 288 upwardly about the shaft 302, to which it is pivotally mounted adjacent the rear end thereof, as shown in Fig. 14. As the arm 288 moves upwardly, the rod 274 is pulled upwardly, which causes the link 272 to turn in a counterclockwise direction. This causes the intermeshing shafts 266 to rotate in such a direction as to open the arms 260 and 262. Such arms remain open while the push-off member 280 passes therebetween in shoving the predetermined bunch of wires onto the take-off portion 258 and returning to its position.

The drives for the various operating elements are such that those elements which form the convolutions in the wire are driven continuously and the sinuously formed wire is continuously fed to the setting, cut-off and gathering mechanisms. The cut-off is, of course, operated intermittently and is controllably actuated to cut off wires of various predetermined lengths. During the actual cut-off, the elements which place the set in the wires are stopped. After a predetermined number of wires have been received by the gathering mechanism, the push-off element is actuated to deposit such gather of wire lengths on the take-off portion 258, and at such time the arms 260 and 262 are open to permit such push-off operation.

The machine may be driven by an electric motor 304 (Fig. 1) which is mounted to and operatively connected with a variable speed reducer 306. Such speed reducer may be mounted to the underside of the standard 120. The speed reducer 306 has driven shafts 308 and 310 projecting from opposite sides thereof. The drive shaft 310 may be connected through a chain 312 and sprockets with the shaft 54 for driving the mechanism which forms the convolutions in the spring. The shaft 308 may be connected through a chain 314 and sprockets with a main drive shaft 316 (Fig. 11) for driving the setting, cutoff, and gathering mechanisms. The various shafts to be described hereinafter are, of course, mounted within suitable bearings in the housing 154 and it is not believed that it is necessary to describe the particular shape of the housing or the particular location and construction of each of the bearings, which are indicated, as such details will be understood by those skilled in the art.

The drive for the setting mechanisms is shown in Fig. 11, and it will be understood that the mechanisms for both of the wires 24 and 26 are driven simultaneously.

The shaft 170, for driving the forming drum 164, projects into the housing 154 and has a double width gear 318 keyed thereto, as shown in Fig. 11. The main drive shaft 316 has a worm 320 keyed thereto which meshes with a worm wheel 322. The worm wheel 322 is keyed to a drive shaft 324, which is axially aligned with the shafts 170. The shaft 324 is continuously driven, during the normal operation of the machine, and the shaft 170 is driven thereby through a flexible driving connection which will permit momentary stoppage of the shaft 170 during the cutting operation.

Such flexible driving connection for each of the shafts 170 includes a member 326, which is keyed to the shaft 324. The member 326 is drivingly connected to a disc member 328 through a worm 330, which is mounted to the member 326 and which drivingly engages teeth formed on the periphery of the disc member 328. The purpose of employing the worm and teeth connection between the members 328 and 326 is to permit relative adjustments therebetween. The plate member 328 has one end of a flat spiral spring 332 connected to the outer edge thereof by means of a pin 334. The inner end of the spring 332 is fixed to a stop ratchet wheel 336 which is keyed to the shaft 170. The stop ratchet wheel 336 serves to hold the shaft 170 stationary during the cutoff operation, and the manner in which it is actuated will be described hereinafter in connection with the description of the operating elements shown in Fig. 19. When the ratchet 336 is stopped, it will be appreciated that rotation of the shaft 170 is also momentarily stopped; and, while the shaft 324 continues to drive, the drive is taken up in the spring 332. When the ratchet 336 is released, it will be appreciated that the spring 332 then returns to its normal position which accelerates the rotation of the shaft 170 until the normal drive is taken up by the shaft 324.

The drive for the driven shafts 186, for the chains 178, is through the double width gears 318. Each of such gears meshes with a gear 338, which is keyed to the shaft 186, as shown in Fig. 11. Such gear 338 is so spaced that it engages one portion of the teeth of gears 318.

The other portion of each of the double faced gears 318 is in mesh with a pinion 340, which is mounted to its casting 156 or 158 by means of a pivot pin 342. Each of such gears 340 then meshes with a drive gear 342, shown in Figs. 11 and 14. Such gear 342 is mounted on shaft 302 (Fig. 14). The gear 342 has a bevel gear 344 fixed to one face thereof which meshes with a bevel pinion 346. The bevel pinion 346 is keyed to a shaft 348 which is mounted to the arm 288 through a bearing bracket 350 and the housing 286. The shaft 348 has an elongated rib 352 extending axially thereof, and a pinion 354 is drivingly connected to the shaft 352 for sliding adjustment therealong. The bevel pinion 354 meshes with a bevel gear 356 which is keyed to the shaft 284 for driving the feed wheel 250.

The purpose of the sliding connection between the shaft 348 and the pinion 354 is to provide for adjustment of the housing 286 along the length of the arm 288, so as to accommodate different lengths of wire. That is, the housing 286 is adjustably connected to the arm 288 by means of bolts 358 which pass through an elongated slot formed in the arm 288. Thus for various lengths of wire the housing 286 may be shifted longitudinally of the arm 288 so that the fingers 252 on the wheel 250 may properly engage the wire as it is fed through the cutoff mechanism.

It will also be appreciated that since the wheel 250 is driven from the gear 318, the drive of such wheel is in synchronism with the drive of the drum 164, so that when the drum 164 is stopped the feed wheel 250 also stops.

The drive for operating the crankshafts 248 to perform the cutting-off operation is shown best in Figs. 11 and 18. The drive is from the shaft 316, and includes a beveled gear 360 keyed to the shaft 316 for rotation therewith. The gear 360 meshes with another beveled gear 362, which is keyed to a vertically extending shaft 364. Such shaft is supported within suitable bearings and a beveled pinion 366 is keyed to the upper end thereof. The pinion 366 meshes with a beveled gear 368, which is fixed to one face of a flywheel 370. The gear 368 and the flywheel 370 are mounted on suitable roller bearings for rotation about a driveshaft 372.

The drive shaft 372 is mounted within suitable bearings and is axially aligned with the crankshafts 248. The shaft 372 is adapted to be clutched to the flywheel 370 at timed intervals to drive the shaft 372 and to perform the cut-off operations by a mechanism which will be described in detail hereinafter.

The adjacent ends of the shafts 248 and 372 are splined, and the ends of shaft 372 are formed with axial projections which are received within axial recesses in the adjacent ends of shafts 248, so as to maintain proper axial alignment between these shafts.

A manual clutch 374 is disposed over the adjacent splined portions at each end of the shaft 372 for the purpose of providing a driving connection therebetween. The clutch 374 is formed with a shape complementary in shape to the splines on shafts 372 and 248, so that by shifting the clutch 274 longitudinally of the shaft such shafts may be thrown into or out of driving engagement. The manual clutches 374 are provided so that the cutoff mechanism may be cut out without affecting the remaining operations of the machine. Normally, the clutches are so positioned that the shafts are in driving engagement.

The flywheel 370 is driven continuously and is intermittently connected to the shaft 372 through a two-part, pin release, slip clutch, which is of conventional construction per se. Such clutch includes one part 376, which is fixed to the gear 368 and the flywheel 370 for constant rotation therewith; and another co-operating clutch part 378, which is resiliently urged into driving engagement with the clutch part 376 by means of a spring 380. The parts 376 and 378 are held out of driving engagement by means of a pin 381, which is fixed to the clutch part 378 for rotation therewith and which, on rotation, is adapted to engage a wedging guide 383 to separate the clutch parts 376 and 378. The wedging member 383 is formed with a shoulder 385, which is engaged by the pin 381 to prevent rotation of the clutch part 378. The member 383 is moved out of engagement with the pin 381, which permits the clutch parts 376 and 378 to engage, through the action of the spring 379, so that both of such clutch parts are driven. The clutch part 378 is fixed to the shaft 372, so that when the clutch part 378 is held against rotation the shaft 372 will not rotate, while when the clutch part 378 rotates, the shaft 372 also rotates. It will be appreciated that when the clutch parts 376 and 378 are in engagement, the crankshafts 248 are then driven through one revolution to perform the cutoff operation.

The cutoff is accurately timed, and means are provided for controlling the release of the clutch part 378 in such accurately timed relationship. The timing of the cutoff may also be varied, so as to vary the length of the strips which are cut off. The timing and control means are shown in Figs. 16 and 18.

The control means includes a vertical member 380 having a longitudinal bore therethrough and having a cap 382 closing the upper end thereof. A hardened tubular member 384 is disposed within a portion of the bore and is adapted to reciprocably receive therein an actuating plunger 386. The lower end of the plunger 386 is pivotally connected to one end of a connecting link 388 by means of a pivot pin 390. The lower end of the link 388 is pivotally connected to a crank arm 392 by means of a pivot pin 394. The crank arm 392 is fixed to one end of a shaft 396, which is mounted within a suitable bearing 398. The shaft 396 has a bevel gear 400 keyed thereto which meshes with another bevel gear 402, which is keyed to the shaft 364. Thus, upon rotation of the shaft 364 the crank arm 392 is rotated to cause reciprocation of the actuating plunger 386 within the sleeve 384.

The sleeve 384 is formed with apertures 404 and 406 therethrough, the lower edge of the aperture 406 lying adjacent the plunger 386 when it is at the bottom of its stroke, and the lower edge of the aperture 404 lying adjacent the plunger when it is at the upper end of its stroke. The apertures 404 and 406 are aligned with downwardly sloping apertures formed in the member 380. A sloping tubular shute 408 is so formed as to have one end thereof in communication with the aperture 406. The shute and the communicating apertures with the apertures 404 and 406 are so formed that the slope is downwardly at all points from the upper aperture 404 to the lower aperture 406.

A predetermined number of small balls 410 and large balls 412 are adapted to be disposed for travel through the shute 408 and through the sleeve 384. When the plunger 386 is at the bottom of its stroke, one of the balls 410 or 412 will drop through aperture 406 onto the top of the actuating plunger 386.

In order to insure the positioning of a ball onto the top of plunger 384, a dog 414 is pivotally mounted to the member 380 within a suitable space provided therein by means of a pivot pin 416. The dog 414 has a projecting arm 418, which is adapted to extend through a suitable slot to strike one of the balls and force it through aperture 406. The dog is actuated by means of a tab 420, which is received within a groove 422 formed in the plunger 386. As the plunger 386 reaches the lower end of its stroke, the upper end of the groove 422 strikes the tab 420 and causes the dog 414 to strike one of the balls. The dog is normally held to its retracted position by means of a compression spring 424, which engages another projection 426 formed on the dog to cause it to move in a clockwise direction. The lower end of the groove 422 will also strike the projection 420 when the plunger reaches its upper position to insure return of the dog 414 to its out-of-the-way position.

With one of the balls disposed on the top of the plunger 386, when the plunger is moved upwardly it carries the ball to a position adjacent the aperture 404. A guide member 428 is positioned within the sleeve 384 adjacent the aperture 404, and is resiliently urged downwardly by means of a compression spring 430. The member 428 is formed with a 45° face 432, which is directed toward the aperture 404. It will thus be appreciated that when the ball is forced against the face 432 by the plunger 386, it will be forced through aperture 404 and into the upper end of the guide tube 408 from which it will roll downwardly to the outlet 406.

The reciprocation of the plunger is, of course, in timed relation with the cutoff drive through a common drive, and for each reciprocation of the plunger 386 one ball is moved upwardly through aperture 404. A predetermined number of small balls and large balls are employed which represent convolutions in the wire to be cut off. When the small balls pass upwardly within the tube 384, nothing happens to cause actuation of the cutoff mechanism, but when one of the large balls passes upwardly through the tube 384 it actuates means which cause the cutoff. Such actuating means is shown in Fig. 18, and includes an operating arm 434 which is pivotally connected to the member 380 by means of a pivot pin 436. The member 434 is formed with a curved projection 438 along one edge thereof which is adapted to be received through a slot in members 380 and 384, so that the projection extends within the passage through member 384. The projection 438 extends to such a distance within the passage 384 and such passage is of such a size that the small balls 410 may pass by the projection 438 without disturbing its position. However, when one of the large balls passes upwardly through the tube 384, such large ball would engage the projection 438 and cause the member 434 to pivot in a clockwise direction.

The lower end of the member 434 is pivotally connected to a curved connecting arm 440 by means of a pivot pin 442. The arm 440 extends over the clutch member 378, and the member 384 is connected to the opposite end of member 440 for movement therewith. Such opposite end of the member 440 is also pivotally connected to a piston rod 442. The piston of rod 442 is disposed within a cylinder 444, which is mounted adjacent thereto, and a compression spring 446 is disposed within the cylinder 444 to urge the piston to the right, viewing Fig. 18. The member 384 is thus resiliently urged to the right, so that it is in a position to be engaged by the pin 382, and the member 434 is resiliently urged in a counter-clockwise direction so that the projection 448 normally lies within the tubular passage formed by member 384.

As stated above, the small balls will pass the projection 438 without disturbing its position, but when one of the large balls strikes the projection 438, it causes the arm 440 to move to the left, viewing Fig. 18, against the action of the spring 436. This releases the pin 382, so that the clutch member 378 will engage the clutch member 376 to cause the cutoff operation. It will thus be appreciated that by varying the number of small balls with respect to the number of large balls, the lengths cut off may be easily varied.

As stated above, the ratchet wheels 336 are stopped to stop the drive of the setting mechanism during the cutoff. The means for controlling the timing and stopping of the ratchet wheel 336 are shown in Fig. 19, with the elements illustrated in the postion with the wheel free to rotate. A cam 450 is keyed to the shaft 372 for rotation when such shaft rotates. A bell crank leverage member 452 is mounted adjacent the cam 450 and is pivotally attached to the casing by means of a pivot pin 454. The upwardly projecting arm of the lever 452 has a cam follower or roller 456 mounted thereon which is resiliently urged against the periphery of the cam 450 by a tension spring 457. Depending rods 458 are connected to the lower arms; and while there is only one of such rods 458 illustrated, it will be understood that another of such rods is provided in spaced relation to the first, so that there will be one for each of the ratchet wheels 436. The lower end of each of the rods 458 is pivotally connected to a stop ratchet 460 which is pivotally mounted intermediate its ends by pivot pin 462 to the housing. Normally, the ratchet 460 is out of engagement with the ratchet wheel in the position shown but when the shaft 372 is rotated the lever 452 is rocked in a counter-clockwise direction by the spring 457 which causes the ratchet 460 to engage the ratchet wheel 336 and stop shaft 170.

The means for controlling the timed actuation of the push-off member 280 are best shown in Figs. 11, 12 and 19. Such means include a silent chain sprocket wheel 464 which is keyed to the shaft 324 for rotation therewith. The sprocket wheel 464 is connected by a silent sprocket chain to a silent chain sprocket wheel 466 (Fig. 12). Such sprocket wheel 466 embraces the shaft 294 and is connected to such shaft through a clutch similar to the clutch 376 and 378 above described. The sprocket wheel 466 is connected to the clutch part corresponding to the clutch part 476, above described, which is adapted to co-operate with another clutch part 468, which corresponds to the clutch part 378 above described. The clutch part 468 is keyed to the shaft 294 and is provided with a pin 470, which corresponds to the pin 382 above described. The ratchet wheel 466 and the clutch part attached thereto are continuously driven and are normally held out of engagement with the clutch part 468 through the action of the pin 470 which engages in a wedge recess 472 formed in a lever member 474. The pin 470 strikes the shoulder of the wedge recess 472 so that, normally, the plate 468 is held out of engagement with its co-operating clutch part and the shaft 294 is held against rotation.

The lever 474 is pivotally connected to the housing through a pivot pin 476 and the other end of the lever 474 is pivotally connected to an actuating rod 478 by means of a pivot pin 480. The rod 478 is connected to the lower end of a depending lever 482 by a pivot pin 484, and the upper end of the lever 482 is pivotally connected to the housing by pivot pin 486. A spring 487 may be provided for resiliently urging the lever 482 in a clockwise direction.

Means are then provided associated with the cutoff so that the lever 482 is moved in a counter-clockwise direction at predetermined intervals and after a predetermined number of wires has been collected so as to push the predetermined number off onto the pick-up portion 258. Such means include a pawl 488 which is pivotally connected to the upstanding arm of the lever 452 by means of a pivot pin 490. The inner end of the pawl 488 is formed with a pair of notches 492 therein, and one is adapted to be engaged by a spring urged ball detent 494. Thus, the pawl 488 may be held in its operating position, as shown, or may be pivoted so that the other groove 492 is engaged by the detent 494 so that the pawl 488 may be held in its inoperative position when it is desired to cut out the gathering and push-off mechanism. Upon rocking of the arm 452 in a clockwise direction, the pawl 488 is adapted to engage the teeth of a small ratchet wheel 496. Such ratchet wheel 496 is keyed to a shaft 498, which may be mounted in suitable bearings in the housing, and the ratchet wheel 496 has a number of teeth corresponding to the number of lengths of wire it is desired to gather in each bundle. For each revolution of the shaft 472 the ratchet wheel 496 is moved one notch, which represents one length of wire.

Another ratchet wheel 500 of larger diameter than the ratchet wheel 496 is also keyed to the shaft 498 for rotation with the ratchet wheel 496. The wheel 500 has only one tooth 502 thereon and such tooth is adapted to engage a projection 504 on the lever 482. The notch 502 will engage the lever 482 to move it in a counter-clockwise direction for each complete revolution of the wheels 496 and 500. Thus, with a ratchet wheel 496 of, for example, ten teeth, after ten lengths have been gathered in a bunch, the tooth 502 would actuate the lever 482 and move the lever 474 out of engagement with the pin 470. This would then permit engagement of the clutch member 468 with its co-operating clutch member on the sprocket wheel 466 so that the shaft 294 would be turned through one complete revolution.

Complementary cam members 504 and 506 are mounted on the shaft 294 for rotation therewith in a housing 514, and such cam members provide a continuous cam track 508.

A pair of actuating levers 510 and 512 are mounted for pivotal movement on a shaft 516 in vertically spaced positions. The lever 510 is disposed on top of the cam members 504 and 506 and the lever 512 is disposed under such cam members. The levers 510 and 512 are provided with cam followers 516 and 518 respectively. Such cam followers may be in the form of rollers; and the cam follower 516 is disposed on the under side of lever 510 while the cam follower 518 is disposed on the top side of lever 512. Thus, the cam follower 516 follows in the cam track 508 on the top, while the follower 518 follows in the cam track 508 on the bottom.

The lever 510 is connected to one of the push-off members 280 by means of a link 520. Such link 520 is pivotally connected to the lever 510 by a pin 522 and is pivotally connected to the member 280 by a pin 524. The lever 512 is similarly connected to the other push-off member 280.

Thus, when the shaft 294 rotates through one complete revolution, the cam track 508 will cause the levers 510 and 512 to swing in such a manner that both of the push-off members 260 are actuated to remove the bunches of wire from the portions 256 to the take-off portions 258.

As stated above, the notched members 296 rotates when shaft 294 is rotated. The rotation of this shaft causes the separation of the fingers 260 and 262, so that the push-off members in their reciprocation may pass therebetween.

The detailed operation of each of the various mechanisms has been described above in connection with the detailed description of each of such mechanisms. It is not believed, therefore, that it is necessary to repeat here a detailed description of the operation of the various mechanisms of the machine. In general, the straight wires are continuously passed through the mechanism which forms the sinuous convolutions therein, and such wires are then separated and continuously fed to identical setting, cutoff, stacking, and push-off mechanisms. In each of such setting mechanisms, a permanent set is placed in the wire longitudinally thereof, and the wire is then passed to a cutoff. The travel of the wire is stopped during the cutoff and the setting mechanism is also stopped in synchronism with the cutoff mechanism. As the wire passes through the cutoff mechanism, and before it is cut off, it is engaged by a feed drum and the drive of such drum is also stopped during the cutoff. As soon as the wire has been cut off to length, such length is fed by the feed drum to a stacking mechanism. After a predetermined number of lengths of wire have been gathered or stacked, the push-off mechanism is automatically actuated to dispose such stack onto a take-off support.

What is claimed is:

1. In a machine for bending a wire laterally into sinuous form, means mounting a plurality of bell cranks for rotation about spaced centers, means providing cam tracks for each of said centers for engaging one arm of the bell cranks for controlling the position of the other arm, said other arm advancing alternately between and beyond the medial line between said centers for forming the wire as it is drawn therebetween, and means for adjustably varying the shapes of said cam tracks for changing the degree of movement of said arms for changing the sinuous form of said wire.

2. In a machine for bending a wire laterally into sinuous form, means mounting a plurality of bell cranks for rotation about spaced centers, means providing cam tracks for each of said centers for engaging one arm of the bell cranks for controlling the position of the other arm, said other arm advancing alternately between and beyond the medial line between said centers for forming the wire as it is drawn therebetween, means for adjustably varying the shapes of said cam tracks, and additional means associated with each of said spaced centers operating in synchronism with the cams for engaging and moving the bell crank arms.

3. In a machine for bending a wire laterally into sinuous form, means mounting a plurality of bell cranks for rotation about spaced centers, means providing cam tracks for each of said centers for engaging one arm of the bell cranks for controlling the position of the other arm, said other arm advancing alternately between and beyond the medial line between said centers for forming the wire as it is drawn therebetween, means for adjustably varying the shapes of said cam tracks, additional means associated with each of said spaced centers operating in synchronism with the cams for engaging and moving the bell crank arms, and means for adjusting said last named means about said spaced centers.

4. In a machine for bending a wire laterally into sinuous form, means mounting a plurality of bell cranks for rotation about spaced centers, means providing cam tracks for each of said centers for engaging one arm of the bell cranks for controlling the position of the other arm, said other arm advancing alternately between and beyond the medial line between said centers for forming the wire as it is drawn therebetween, and additional means associated with each of said spaced centers operating in synchronism with the cams for engaging and moving the bell crank arms.

5. In a machine for bending a wire laterally into sinuous form, means mounting a plurality of bell cranks for rotation about spaced centers, means providing cam tracks for each of said centers for engaging one arm of the bell cranks for controlling the position of the other arm, said other arm advancing alternately between and beyond the medial line between said centers for forming the wire as it is drawn therebetween, additional means associated with each of said spaced centers operating in synchronism with the cams for engaging and moving the bell crank arms, and means for adjusting said last named means about said separated centers.

6. In a machine for bending a wire laterally into sinuous form, means mounting a plurality of bell cranks for rotation about spaced centers, means providing cam tracks for each of said centers for engaging one arm of the bell cranks for controlling the position of the other arm, said other arm advancing alternately between and beyond the medial line between said centers for forming the wire as it is drawn therebetween, additional means associated with each of said spaced centers separating in synchronism with the cams for engaging and moving the bell crank arms, said additional means including a pair of members having developed cam edges, said members being mounted on spaced driven shafts, and means for adjusting said shafts about their respective separated centers.

7. In a machine for bending a wire laterally into sinuous form, means mounting a plurality of bell cranks for rotation about spaced centers, means providing cam tracks for each of said centers for engaging one arm of the bell cranks for controlling the position of the other arm, said other arm advancing alternately between and beyond the medial line between said centers for forming the wire as it is drawn therebetween, additional means associated with each of said spaced centers separating in synchronism with the cams for engaging and moving the bell crank arms, said additional means including a pair of members having developed cam edges, said members being mounted on spaced driven shafts, and means for simultaneously adjusting said shafts toward and away from each other about respective separated centers.

8. In a machine for bending a wire laterally into sinuous form, means mounting a plurality of bell cranks for rotation about spaced centers, means providing cam tracks for each of said centers for engaging one arm of the bell cranks for controlling the position of the other arm, said other arm advancing alternately between and beyond the medial line between said centers for forming the wire as it is drawn therebetween, means for adjustably varying the shapes of said cam tracks in positions adjacent said medial line and on the trailing side thereof, additional means associated with each of said spaced centers separating in synchronism with the cams for engaging and moving the bell crank arms, said additional means including a pair of members having developed cam edges, said members being mounted in spaced driven shafts, and means for adjusting said shafts about their respective separated centers.

9. In a machine for bending a wire laterally into sinuous form, means mounting a plurality of bell cranks for rotation about spaced centers, means providing cam tracks for each of said centers for engaging one arm of the bell cranks for controlling the position of the other arm, said other arm advancing alternately between and beyond the medial line between said centers for forming the wire as it is drawn therebetween, means for adjustably varying the shapes of said cam tracks in positions adjacent said medial line and on the trailing side thereof, additional means associated with each of said spaced centers separating in synchronism with the cams for engaging and moving the bell crank arms, said additional means including a pair of members having developed cam edges, said members being mounted in spaced driven shafts, and means for simultaneously adjusting said shafts toward and away from each other about respective separated centers.

10. In a spring wire forming machine, in combination, means for forming a straight wire into sinuous form, means for rolling said sinuously formed wire lengths to provide a set therein on an arc of predetermined radius, means for thereafter severing said wire into predetermined lengths, and means for gathering said lengths into bundles with the lengths wound onto each other at increased distances from the center of said gathering means.

11. In a spring wire forming machine, in combination, means for forming a straight wire into sinuous form, means for rolling said sinuously formed wire lengths to provide a set therein on an arc of predetermined radius, means for thereafter severing said wire into predetermined lengths, means for gathering said lengths upon each other into bundles which are held together by the set in the length, and means for removing said bundles of wire from the gathering means after a predetermined number have been built upon each other thereon.

12. In a spring wire forming machine, in combination, means for forming a straight wire into sinuous form, means for rolling said sinuously formed wire longitudinally to provide a set therein on an arc of predetermined radius, means for thereafter severing said wire into predetermined lengths, means for gathering said lengths into cylindrical bundles by disposing one arcuate length upon another, said gathering means including resiliently urged movable arms which engage the outer side of said wire lengths, and feed means engaging said wire prior to severing and after severing for feeding the several severed lengths to the gathering means between said movable arms.

13. In a spring wire forming machine, in combination, means for forming a straight wire into sinuous form, means for rolling said sinuously formed wire longitudinally to provide a set therein on an arc of predetermined radius, means for thereafter severing said wire into predetermined lengths, means for gathering said lengths into bundles, said gathering means including resiliently urged, movable arms which engage the outer side of said wire lengths, feed means engaging said wire prior to severing and after severing for feeding the several severed lengths to the gathering means between said movable arms, means for removing said bundles of wire from the gathering means after a predetermined number have been gathered, and means for separating said movable arms during operation of said removing means.

14. In a spring wire forming machine, in combination, means for forming a straight wire into sinuous form, means for rolling said sinuously formed wire longitudinally to provide a set therein on an arc of predetermined radius, means for thereafter intermittently severing said wire into predetermined lengths, means for gathering said lengths into bundles by winding one length upon another, feed means engaging said wire prior to severing and after severing for feeding said lengths to the gathering means, and means for stopping the operation of the rolling means and the feed means during the intermittent operation of the severing means.

15. In a spring wire forming machine, in combination, means for rolling sinuously formed wire longitudinally to provide a set therein, means for thereafter intermittently severing said wire into predetermined lengths, drive means for synchronously operating said rolling and severing means, and throwout means disposed between said rolling means and said severing means, said throw-out means being engaged by the wire passing to said severing means to be actuated by such engagement to stop said drive means in the event the synchronous operation between the rolling means and severing means is not proper.

16. In a spring wire forming machine, in combination, means for rolling sinuously formed wire longitudinally to provide a set therein, means for thereafter intermittently severing said wire into predetermined lengths, drive means for synchronously operating said rolling and severing means, and throw-out means disposed between said rolling means and said severing means, said throw-out means being engaged by the wire passing to said severing means to be actuated by such engagement to stop said drive means in the event the synchronous operation between the rolling means and severing means is not proper, said last named means including a guideway having one side formed by a movable member which is engaged by said wire, and means responsive to the movement of said movable member to stop operation of said drive means.

17. In a spring wire forming machine, means for rolling sinuously formed wire longitudinally to provide a set therein on an arc of predetermined radius, said means comprising a forming drum, a pair of rolls disposed adjacent said drum, a shaft supporting said rolls one of which is directly driven thereby, an endless, forming belt disposed about said rolls and adapted to receive the wire between the belt and the drum, and means for adjusting said rolls toward and away from each other to thereby vary the contour of the forming belt.

18. In a spring wire forming machine, means for rolling sinuously formed wire longitudinally to provide a set therein on an arc of predetermined radius, said means comprising a forming drum, a pair of rolls disposed adjacent said drum, an endless, forming belt disposed about said rolls and adapted to receive the wire between the belt and the drum, a shaft for driving one of the rolls and belt, and means for adjusting the other roll toward and away from the drum.

19. In a spring wire forming machine, means for rolling sinuously formed wire longitudinally to provide a set therein on an arc of predetermined radius, said means comprising a forming drum, a pair of rolls disposed adjacent said drum, an endless, forming belt disposed about said rolls and adapted to receive the wire between the belt and the drum, a shaft for driving one of the rolls, and resilient means urging said other roll on an arc about said shaft to adjust the position of the belt relative to the drum.

20. In a spring wire forming machine, means for rolling sinuously formed wire longitudinally to provide a set therein on an arc of predetermined radius, said means comprising a forming drum, a pair of rolls disposed adjacent said drum, an endless, forming belt disposed about said rolls and adapted to receive the wire between the belt and the drum, means for adjusting the position of the belt relative to said drum, and means for moving the belt to and from said drum without disturbing the adjustment position of one of the rolls with respect to the drum, and means for adjusting the other roll toward and away from the drum, said last named means including means to move said last named roll from its adjusted position away from said drum without disturbing the adjustment setting.

21. In a spring gathering device, an arbor, means for winding separate lengths of spring strips of predetermined width upon said arbor and upon each other to build up a cylindrical bundle of substantially the same width as the strips, and means for ejecting said bundle from said arbor after a predetermined number of springs have been assembled therein.

HOWARD W. WILKINS.